(12) United States Patent
Kwak et al.

(10) Patent No.: US 10,594,479 B2
(45) Date of Patent: Mar. 17, 2020

(54) METHOD FOR MANAGING SMART HOME ENVIRONMENT, METHOD FOR JOINING SMART HOME ENVIRONMENT AND METHOD FOR CONNECTING COMMUNICATION SESSION WITH SMART DEVICE

(71) Applicant: AJOU UNIVERSITY INDUSTRY-ACADEMIC COOPERATION FOUNDATION, Suwon-si, Gyeonggi-do (KR)

(72) Inventors: Jin Kwak, Cheonan-si (KR); Ho Seok Ryu, Uiwang-si (KR)

(73) Assignee: AJOU UNIVERSITY INDUSTRY-ACADEMIC COOPERATION FOUNDATION, Suwon-si (KR)

( * ) Notice: Subject to any disclaimer, the term of this patent is extended or adjusted under 35 U.S.C. 154(b) by 117 days.

(21) Appl. No.: 15/331,309

(22) Filed: Oct. 21, 2016

(65) Prior Publication Data
US 2017/0118015 A1 Apr. 27, 2017

(30) Foreign Application Priority Data
Oct. 23, 2015 (KR) .................. 10-2015-0148149

(51) Int. Cl.
*H04L 29/06* (2006.01)
*H04L 9/08* (2006.01)
(Continued)

(52) U.S. Cl.
CPC ............ *H04L 9/0833* (2013.01); *G05B 15/02* (2013.01); *H04L 9/0866* (2013.01);
(Continued)

(58) Field of Classification Search
CPC ... H04L 9/0833; H04L 63/065; H04L 63/083; H04L 63/0876; H04L 9/3236; H04L 2209/24; G05B 15/02
See application file for complete search history.

(56) References Cited

U.S. PATENT DOCUMENTS

| | | | | |
|---|---|---|---|---|
| 2007/0162750 A1* | 7/2007 | Konig | ................... | H04L 9/0833 713/168 |
| 2015/0186611 A1* | 7/2015 | George | .................... | A61G 7/05 705/51 |
| 2017/0041296 A1* | 2/2017 | Ford | ................... | H04L 63/0421 |

FOREIGN PATENT DOCUMENTS

| | | |
|---|---|---|
| KR | 10-0970318 B1 | 7/2010 |
| KR | 10-2014-0045829 A | 4/2014 |
| KR | 10-1537097 B1 | 7/2015 |

OTHER PUBLICATIONS

Dae-Sung Choi and Hyoung-Kee Choi. "An Group-based Security Protocol for Machine Type Communications in LTE-Advanced" Journal of the Korea Institute of Information Security & Cryptology (JKIISC) vol. 23, No. 5, Oct. 2013: pp. 885-896.

(Continued)

*Primary Examiner* — Harunur Rashid
(74) *Attorney, Agent, or Firm* — Stein IP, LLC (57) ABSTRACT

According to an aspect of the inventive concept, there is provided a method of managing a smart-home environment by a server, including: receiving identification information and a password of a new smart device from a user terminal; generating a new group key based on the received identification information of the new smart device and identification information of an existing smart device; transmitting the new group key to the existing smart device; receiving identification information and a password from the new smart device; and comparing the identification information and the password received from the new smart device with (Continued)

the identification information and the password received from the user terminal, and transmitting the new group key to the new smart device according to a result of the comparison.

9 Claims, 6 Drawing Sheets (51) Int. Cl.
    *H04L 9/32*           (2006.01)
    *H04L 12/28*         (2006.01)
    *H04L 29/08*         (2006.01)
    *G05B 15/02*         (2006.01)

(52) U.S. Cl.
    CPC .......... *H04L 9/3226* (2013.01); *H04L 9/3236* (2013.01); *H04L 12/2803* (2013.01); *H04L 63/0428* (2013.01); *H04L 63/065* (2013.01); *H04L 63/08* (2013.01); *H04L 63/083* (2013.01); *H04L 63/0876* (2013.01); *H04L 63/10* (2013.01); *H04L 67/12* (2013.01); *H04L 2209/24* (2013.01)

(56) References Cited

OTHER PUBLICATIONS

Mantoro, T., Adnan, M.A.M., Ayu, and M.A., "Secured communication between mobile devices and smart home appliances," Advanced Computer Science Applications and Technologies (ACSAT), 2013 International Conference on, pp. 429-434, Dec. 2013.

Soo-bok Shin, Hong-jin Yeh, and Kang-seok Kim, "A ticket based authentication scheme for group communication," In Proceedings of The 2012 International Conference on Information Security and Assurance, pp. 152-155, Apr. 2012.

Jong-hyuk Park, "An authentication protocol offering service anonymity of mobile device in ubiquitous environment," The Journal of Supercomputing, vol. 62, No. 1, pp. 105-117, Oct. 2012.

Notice to Submit Response dated Oct. 17, 2016, issued to Korean Application No. 10-2015-0148149.

* cited by examiner

METHOD FOR MANAGING SMART HOME ENVIRONMENT, METHOD FOR JOINING SMART HOME ENVIRONMENT AND METHOD FOR CONNECTING COMMUNICATION SESSION WITH SMART DEVICE

CROSS-REFERENCE TO RELATED APPLICATION

This application claims the benefit of Korean Patent Application No. 10-2015-0148149, filed on Oct. 23, 2015, in the Korean Intellectual Property Office, the disclosure of which is incorporated herein in its entirety by reference.

BACKGROUND ART

1. Field

The inventive concept relates to a smart-home field, and more particularly, to a method of managing a smart-home environment by a server, a method of joining the smart-home environment for a smart device, and a method of connecting a communication session with the smart device by a user terminal.

2. Description of the Related Art

Recently, use of smart devices is popularized as information communication technology (ICT) is developing. Accordingly, services with respect to smart-home, smart healthcare, and smart medical treatment capable of being connected to the smart devices are provided.

Smart-home indicates an intelligent home environment in which a user and household appliances may transmit and receive information and data to/from each other in real time by ICT merged with an existing home environment. The smart-home may be divided into home platform technology, wired-wireless network technology, smart device technology, and green-home technology, and a user may receive services such as remote meter reading, control of an air-conditioning system, lighting control, and control of household appliances by accessing the smart-home from the outside using wired-wireless network technology.

A smart-home environment provides convenience to a user, but there are various security threats since smart devices have a network function. When a malignant device accesses smart devices through a network function, a new security threat appears as well as existing security threats such as data forgery, an illegal authentication, or a privacy invasion in an existing communication environment. Furthermore, secondary damage may also occur due to characteristics of the smart-home. Therefore, solutions for blocking or preventing various security threats which may occur in a smart-home environment are required.

SUMMARY

The inventive concept is directed to a method of managing a smart-home environment, a method of joining the smart-home environment, and a method of connecting a communication session with a smart device, thereby blocking various security threats which may occur in the smart-home environment.

Furthermore, the inventive concept is directed to a method of managing a smart-home environment, a method of joining the smart-home environment, and a method of connecting a communication session with a smart device, thereby enhancing the security of the smart-home environment with reduced load compared to a conventional method of blocking security threats.

According to an aspect of an embodiment, a method of managing a smart-home environment by a server includes: receiving identification information and a password of a new smart device from a user terminal; generating a new group key based on the received identification information of the new smart device and identification information of an existing smart device; transmitting the new group key to the existing smart device; receiving identification information and a password from the new smart device; and comparing the identification information and the password received from the new smart device with the identification information and the password received from the user terminal, and transmitting the new group key to the new smart device according to a result of the comparison.

In an example embodiment, the method of managing a smart-home environment may further include generating a hash value of the identification information received from the user terminal, and the transmitting the new group key to the new smart device includes transmitting the new group key to the new smart device by encrypting with the generated hash value.

In an example embodiment, the transmitting the new group key to the existing smart device may include transmitting the new group key to the existing smart device by encrypting with an existing group key.

In an example embodiment, the generating the new group key may include performing an Exclusive OR (XOR) operation of the identification information of the new smart device received from the user terminal and the identification information of the existing smart device.

In an example embodiment, the identification information received from the new smart device may be encrypted with a hash value of the identification information of the new smart device, and the method of managing the smart-home environment may further include decoding the encrypted identification information with a hash value of the identification information of the new smart device received from the user terminal.

In an example embodiment, the method of managing a smart-home environment by a server may further include: receiving identification information, a password, a request message, and a random number of the user terminal from the user terminal; authenticating the user terminal by comparing pre-stored identification information and password of the user terminal with the identification information and the password of the user terminal received from the user terminal; and when the user terminal is authenticated, transmitting the request message and the random number to smart devices that are members of the smart-home in such a manner that the user terminal and a session between the smart devices that are members of the smart-home are connected to each other.

In an example embodiment, the identification information, the request message, and the random number of the user terminal received from the user terminal may be encrypted with a new group key when the new group key is already generated, or encrypted with an existing group key when the new group key is not generated yet.

In an example embodiment, the receiving identification information, a password, a request message, and a random number of the user terminal from the user terminal may include: further receiving time information from the user terminal; and authenticating the user terminal when a difference between the received time information and information about an actual time receiving the time information is a preset value or less.

In an example embodiment, the method of managing a smart-home environment by a server may further include: deleting identification information and a password of a withdrawing smart device from among pieces of identification information and passwords of smart devices configuring the smart-home environment; regenerating a new group key based on pieces of identification information of the other smart devices excluding the identification information of the withdrawing smart device; and transmitting the regenerated new group key to the other smart devices.

In an example embodiment, the transmitting the regenerated new group key may include encrypting the regenerated new group key with each of hash values corresponding to the other smart devices and transmitting the results to the other smart devices, respectively.

According to an aspect of another embodiment, a method of joining a smart-home environment by a smart device includes: transmitting identification information and password of the smart device to a server; receiving an encrypted new group key from the server according to an authentication result based on the identification information and the password of the smart device; and obtaining the new group key by decoding the encrypted new group key with a hash value of the identification information of the smart device.

According to an aspect of another embodiment, a method of connecting a session with a smart device in a smart-home environment by a user terminal includes: transmitting identification information, a password, a request message, and a random number of the user terminal to a server; receiving a random number from a smart device receiving the request message and the random number from the server, according to an authentication result based on the identification information and the password of the user terminal; authenticating the smart device by comparing a random number generated by the user terminal with the random number received from the smart device; and connecting the session with the smart device after the authentication of the smart device is completed.

According to a method of managing a smart-home environment, a method of joining the smart-home environment, and a method of connecting a communication session with a smart device according to the inventive concept, various security threats which may occur in the smart-home environment may be blocked.

Furthermore, according to a method of managing a smart-home environment, a method of joining the smart-home environment, and a method of connecting a communication session with a smart device according to the inventive concept, the security of the smart-home environment may be enhanced with reduced load compared to a conventional method of blocking security threats.

DESCRIPTION OF THE DRAWINGS

These and/or other aspects will become apparent and more readily appreciated from the following description of the embodiments, taken in conjunction with the accompanying drawings in which.

DETAILED DESCRIPTION OF THE EXAMPLE EMBODIMENTS

The inventive concept may be variously modified and have various example embodiments, so that specific example embodiments will be illustrated in the drawings and described in the detailed description. However, this does not limit the inventive concept to specific example embodiments, and it should be understood that the inventive concept covers all the modifications, equivalents and replacements included within the idea and technical scope of the inventive concept.

In describing the inventive concept, in the following description, a detailed explanation of known related technologies may be omitted to avoid unnecessarily obscuring the subject matter of the inventive concept. In addition, numeral figures (for example, 1, 2, and the like) used during describing the specification are just identification symbols for distinguishing one element from another element.

Further, in the specification, if it is described that one component is "connected" or "accesses" the other component, it is understood that the one component may be directly connected to or may directly access the other component but unless explicitly described to the contrary, another component may be "connected" or "access" between the components.

In addition, terms including "unit", "er", "or", "module", and the like disclosed in the specification mean a unit that processes at least one function or operation and this may be implemented by hardware or software such as a processor, a micro processor, a micro controller, a central processing unit (CPU), a graphics processing unit (GPU), an accelerated Processing unit (APU), a digital signal processor (DSP), an application specific integrated circuit (ASIC), and a field programmable gate array (FPGA) or a combination of hardware and software.

Moreover, it is intended to be clarified that distinguishing components in the specification just distinguishing the components for each primary function which each component takes charge of. That is, two or more components to be described below may be provided to be combined to one component or one component may be provided to be divided into two or more components for each more subdivided function. In addition, each of the respective components to be described below may additionally perform some or all functions among functions which other components take charge of in addition to a primary function which each component takes charge of and some functions among the primary functions which the respective components take charge of are exclusively charged by other components to be performed, of course.

As described above, there are various security threats in a smart-home environment, and security requirements for the smart-home environment to block the various security threats are as below.

(1) Data Confidentiality

In a smart-home environment, pieces of sensitive information such as personal information and control messages which may violate privacy are transmitted through a network. Therefore, data needs to be encrypted and transmitted and received during communication in such a manner that an unauthorized third party cannot read data.

(2) Access Control

In a smart-home environment, all access authority such as reading and modifying of data needs to be distinguished. An attempt to access an unauthorized device should be blocked in advance to prevent security threats.

(3) Device Integrity

A smart-home device requires a protector because physical access as well as network access is possible. Furthermore, an attacker may insert malicious software in a smart-home device and may change the use of the smart-home device through malware. If integrity is not guaranteed, the entire smart-home environment may be infected by malware or availability of smart-home environment may be damaged. Therefore, integrity of a smart-home device is necessary.

(4) Device Authentication

Many smart devices are used without considering security, and unauthenticated smart devices may access through a wireless network. When a discarded or copied smart device accesses, the smart device may be maliciously used to insert malware or contaminate a smart-home environment. Furthermore, when an attacker disguises the discarded or copied smart device as a normal device, normal use of a user may be impossible. Therefore, an authentication of a smart device is necessary.

There are various conventional techniques to satisfy the security requirements as above, but each of the conventional techniques has some disadvantages. Conventional techniques and disadvantages thereof are as below.

(1) Research of Mantoro, etc. (Mantoro, T., Adnan, M. A. M., Ayu, and M. A., "Secured communication between mobile devices and smart-home appliances," Advanced Computer Science Applications and Technologies (ACSAT), 2013 International Conference on, pp. 429-434, December 2013.

The research of Mantoro, etc. has proposed a secure communication between a mobile terminal and a smart device. The proposed technique is a system in which a user allocates a public key and a password of a smart device to a mobile terminal and all smart devices and permits access of the smart devices by storing the public key and the password in a database of each smart device. The proposed technique is a system safe from man-in-the-middle attacks by performing encryption with a public key. However, since passwords and public keys of all smart devices are stored in each smart device, when one of the smart devices is attacked, the entire smart-home environment may be dangerous in addition to data forgery. Furthermore, a public key-based authentication of a smart device may lay a burden on the smart device. In addition, since passwords and public keys of all smart devices are stored in each smart device, efficiency is reduced as the number of smart devices in smart-home is increased.

(2) Research of Shin, etc. (Soo-bok Shin, Hong-jin Yeh, and Kang-seok Kim, "A ticket based authentication scheme for group communication," In Proceedings of The 2012 International Conference on Information Security and Assurance, pp. 152-155, April 2012.

Research of Shin, etc. has proposed authentication technique for a group communication in a ubiquitous environment. According to the proposed technique, a user gets a ticket for connecting sessions and connects the sessions to each other with the ticket. An authentication of a smart device by a ticket is efficient because operations of a smart device are minimized. However, data forgery and a retransmission attack are possible since there is no process for verifying device integrity. In this case, the entire smart-home environment may be dangerous when a malignant device accesses. Furthermore, efficiency may be reduced when the number of tickets increases as the number of devices of a group to be managed increases.

(3) Research of Park (Jong-hyuk Park, "An authentication protocol offering service anonymity of mobile device in ubiquitous environment," The Journal of Supercomputing, vol 62, no. 1, pp. 105-117, October.

The research of Park is technique using a public key-based structure with a authentication method of a mobile terminal in a ubiquitous environment. The technique includes a process of registering a mobile terminal at a server by a user to get a ticket, and a process of getting an issued ticket. A user receives services by submitting a ticket to a plurality of service servers. However, high overhead due to a large amount of computation occurs in the mobile terminal by using a public key algorithm during a process of transmitting an authentication message and a ticket to a user. Therefore, efficiency is reduced in an environment requiring high speed and low power consumption, and computation is also burdened.

Hereinafter, various example embodiments of the inventive concept, for example, a procedure for joining a new smart device, a procedure for connecting a communication session with a user terminal, and a procedure for withdrawing of a smart device, will be described referring to FIGS. 1 through 6. In this regard, definitions of notations used in the present specification are as below Table 1.

TABLE 1

| Notation | Description |
| --- | --- |
| DeviceInfo | The smart home device's information |
| DeviceInfo' | The smart home device's information authentication requested |
| PW | The smart home device's password |
| PW' | The smart home device's password authentication requested |
| $GK_{Home}$ | The smart home's group key |
| $GK_{Home}'$ | The new smart home's group key |
| $H(\cdot)$ | Hash function |
| $H_D$ | Hash value of smart home device's information |
| M | User message |
| $\oplus$ | XOR operation |
| N | Random number |
| $T_D$ | Time stamp of smart home device |
| $\Delta T$ | Valid time interval for transmission delay |

Figure 1:
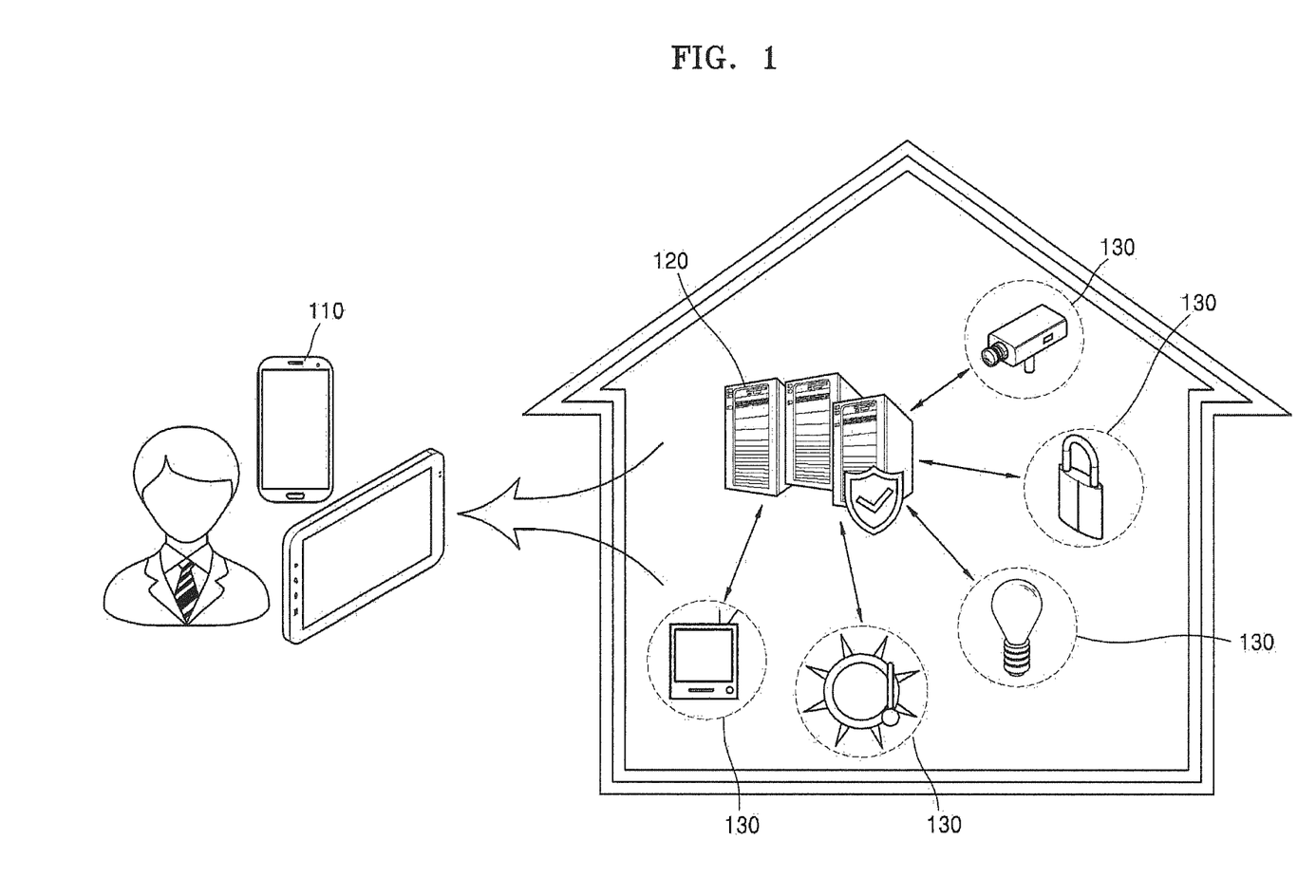
FIG. 1 is an exemplary view of a smart-home environment to which methods according to an embodiment of the inventive concept are applied.

FIG. 1 is an exemplary view of a smart-home environment to which methods according to an embodiment of the inventive concept are applied.

Referring to FIG. 1, a smart-home environment according to an embodiment of the inventive concept may include a user terminal 110, a server 120, and one or more smart devices 130.

The user terminal 110 may transmit and receive data to/from at least one of the smart devices 130 and the server 120 or may control the smart devices 130 by being connected to the smart-home environment from the outside.

FIG. 1 shows a mobile terminal such as a smart phone and a tablet personal computer (PC) as the user terminal 110, but the user terminal 110 is not limited thereto. For example, the user terminal 110 may also include a fixed terminal such as a desktop PC, etc.

The user terminal 110 may be registered at the server 120 in advance to be connected to the smart-home environment (or a smart-home network).

The server 120, which is a manage entity of the user terminal 110 and the smart devices 130 that are members of smart-home, manages procedures for joining, communicating, and withdrawing with respect to the user terminal 110 and the smart devices 130.

The smart devices 130, which are various kinds of devices in the smart-home, may include, for example, household appliances such as a refrigerator, a television (TV), an in-house telephone, lighting, and an audio system. The smart devices 130 may have a network function, and thus may communicate with the server 120 and the user terminal 110.

Figure 2:
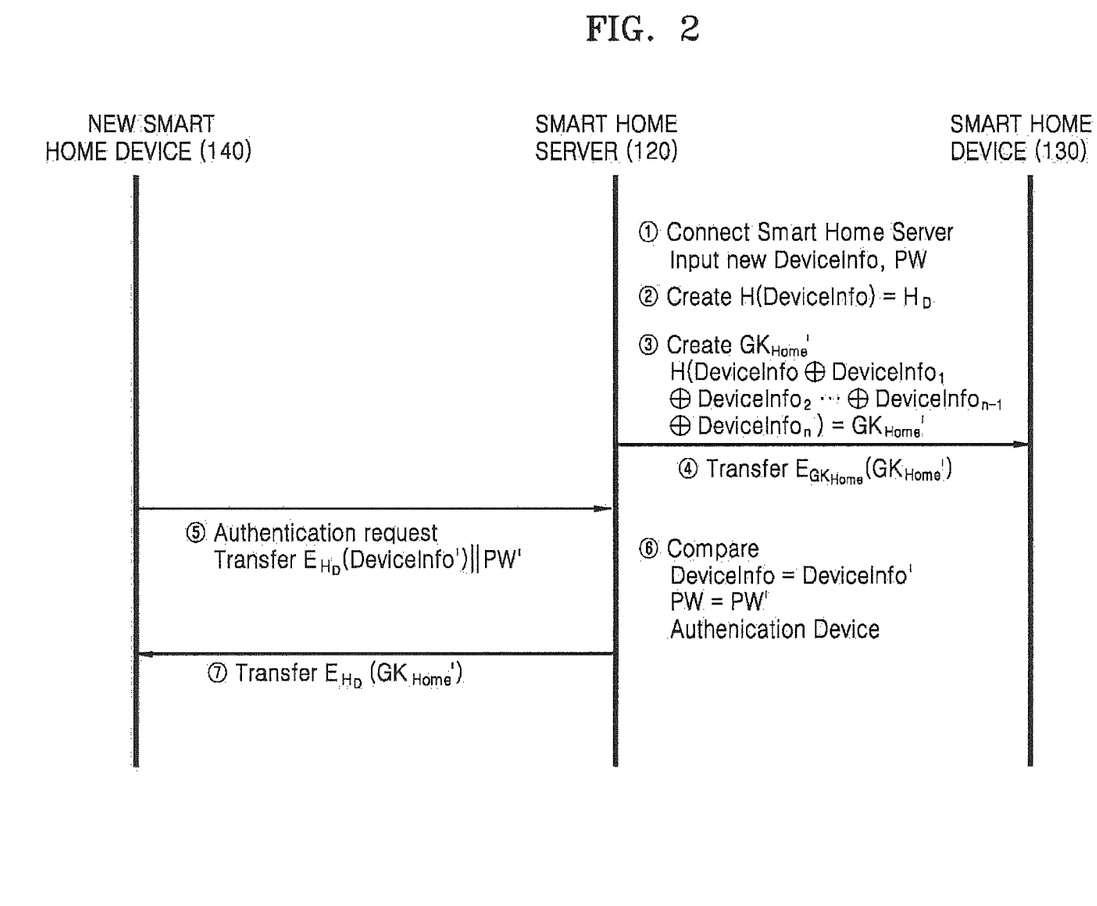
FIG. 2 is a view illustrating a procedure for joining smart-home of a new smart device, according to an embodiment of the inventive concept.

FIG. 2 is a view illustrating a procedure for joining smart-home of a new smart device 140, according to an embodiment of the inventive concept.

① The server 120 receives identification information DeviceInfo and a password PW of the new smart device 140 from the user terminal 110. A user may transmit the identification information DeviceInfo and the password PW of the new smart device 140 to be newly joined to the smart-home environment to the server 120 by being connected to the server 120 through the user terminal 110. According to an embodiment, a user may input the identification information DeviceInfo and the password PW of the new smart device 140 to the server 120 through an input device such as a keyboard or a touch screen connected to the server 120. Identification information DeviceInfo of a smart device may include a specific serial number or device information of the smart device.

② The server 120 generates a hash value $H_D$ of the identification information DeviceInfo of the new smart device 140 received from the user terminal 110.

③ The server 120 operates the identification information DeviceInfo of the new smart device 140 and pieces of identification information $DeviceInfo_1$, $DeviceInfo_2$, ..., $DeviceInfo_n$ of the existing smart devices 130 (for example, an Exclusive OR operation) and generates a new group key $GK_{HOME}'$.

④ The server 120 transmits the new group key $GK_{HOME}'$ to the existing smart devices 130. Here, the server 120 may encrypt the new group key $GK_{HOME}'$ with an existing group key $GK_{HOME}$, in more detail, a group key used in the smart-home before the new group key $GK_{HOME}'$ is generated, and may transmit the encrypted group key to the existing smart devices 130.

⑤ The new smart device 140 transmits its identification information DeviceInfo' and a password PW' to the server 120. Here, the new smart device 140 may encrypt the identification information DeviceInfo' with a hash value $H_D$ of the identification information DeviceInfo', and may transmit the encrypted identification information DeviceInfo' to the server 120 by concatenating the encrypted identification information DeviceInfo' with the password PW'.

⑥ The server 120 receives the password PW' and the encrypted data from the new smart device 140, and obtains the identification information DeviceInfo' of the new smart device 140 by decoding the encrypted data with the hash value $H_D$ generated in operation ②. The new smart device 140 is authenticated by comparing the identification information DeviceInfo' with the identification information DeviceInfo and the password PW received from the user terminal 110 in operation ①.

⑦ If the identification information DeviceInfo' and the password PW' obtained from the new smart device 140 is equal to the identification information DeviceInfo and the password PW received from the user terminal 110, the authentication of the new smart device 140 is determined to be successful and the server 120 transmits the new group key $GK_{HOME}'$ to the new smart device 140. Here, the new group key $GK_{HOME}'$ may be encrypted with the hash value $H_D$ generated in operation ②.

Figure 3:
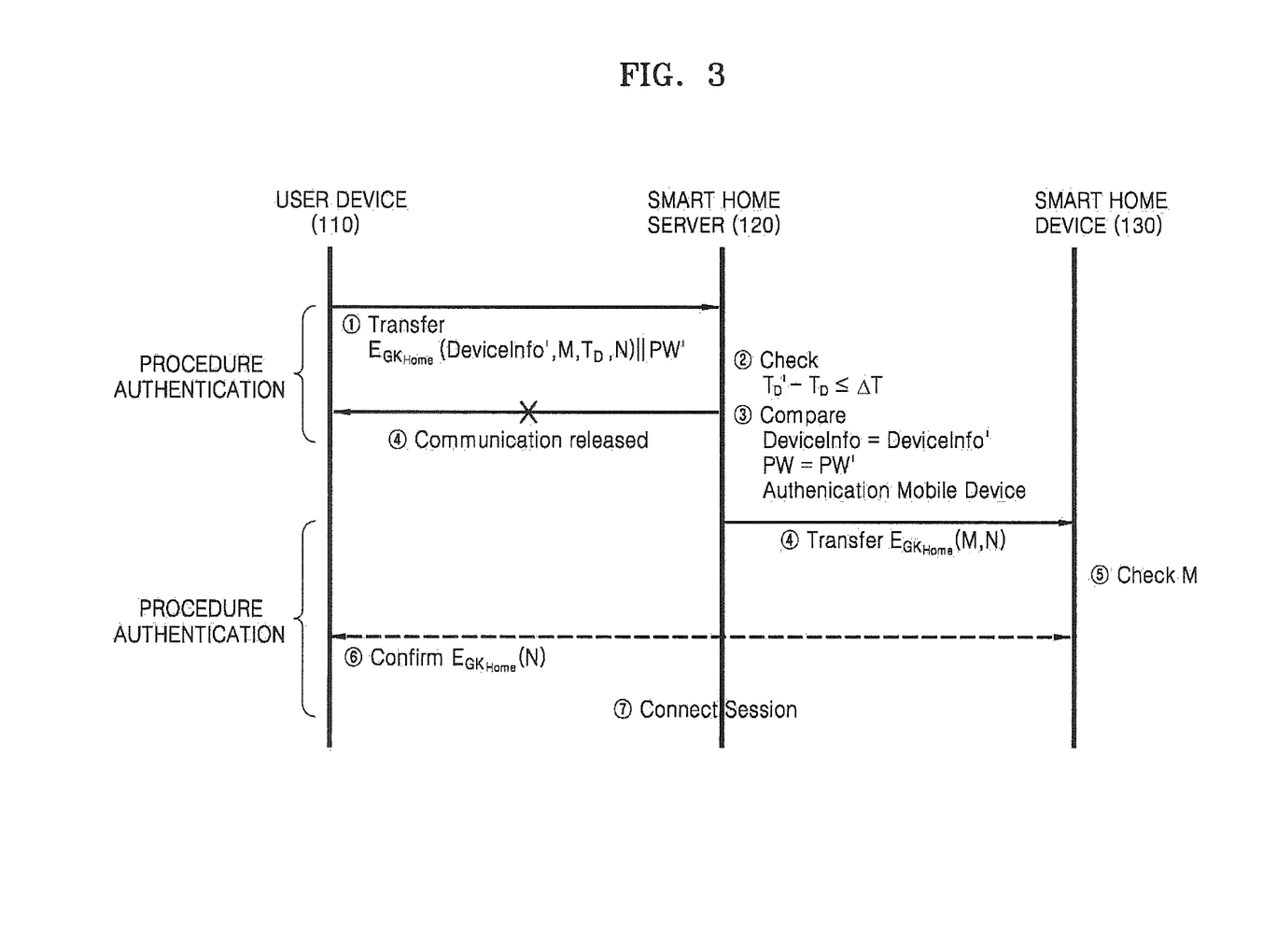
FIG. 3 is a view illustrating a procedure for connecting a communication session with a smart device of smart-home by a user terminal, according to an embodiment of the inventive concept.

FIG. 3 is a view illustrating a procedure for connecting a communication session with the smart device 130 of smart-home by the user terminal 110, according to an embodiment of the inventive concept.

The user terminal 110 needs to connect a communication session with the smart devices 130 to transmit and receive a message or data by accessing smart-home from the outside.

① The user terminal 110 concatenates a value obtained by encrypting identification information DeviceInfo' of the user terminal 110, a request message M, time information $T_D$ to block a retransmission attack, and a random number N generated by the user terminal 110 with a group key $GK_{HOME}$ with the password PW' and transmits the result to the server 120. Here, the group key $GK_{HOME}$ is a group key currently used in the smart-home environment. Accordingly, the group key $GK_{HOME}$ of FIG. 3 may be a new group key $GK_{HOME}'$ if the group key $GK_{HOME}$ of FIG. 3 is generated after the new group key $GK_{HOME}'$ of FIG. 2 is generated, or may be a previous group key $GK_{HOME}$ if the group key $GK_{HOME}$ of FIG. 3 is generated before the new group key $GK_{HOME}'$ of FIG. 2 is generated. Furthermore, the time information $T_D$ indicates a time written by the user terminal 110 as a data transmission time of the user terminal 110.

② The server 120, to confirm effectiveness, determines whether a difference between time information $T_D'$ when data is actually received from the user terminal 110 and the time information $T_D$ is a preset value $\Delta T$ or less according to operation ①, and progresses the next operation if the difference satisfies the condition.

③ When a difference between $T_D'$ and $T_D$ is a preset value $\Delta T$ or less, the server 120 authenticates the user terminal 110 by comparing the identification information DeviceInfo' and the password PW' received from the user terminal 110 with the pre-stored identification information DeviceInfo and password PW of the user terminal 110.

④ When the authentication of the user terminal 110 is successful, the server 120 transmits a value obtained by encrypting the request message M of a user and the random number N with the group key $GK_{HOME}$ to the smart devices 130 that are members of the smart-home. The smart devices 130 receiving encrypted data including the request message M and the random number N may be all of the smart devices 130 of the smart-home or at least one selected from the smart devices 130.

⑤ The smart devices 130 confirms the request message M of a user, and ⑥ transmits a value obtained by encrypting the random number N with the group key $GK_{HOME}$ to the user terminal 110.

⑦ The user terminal 110 obtains a random number N by decoding data received from the smart devices 130, and authenticates the smart devices 130 by comparing the obtained random number N with the random number N generated by the user terminal 110. After the authentication of the smart devices 130 is completed, the user terminal 110 and the smart devices 130 generate a communication session.

Figure 4:
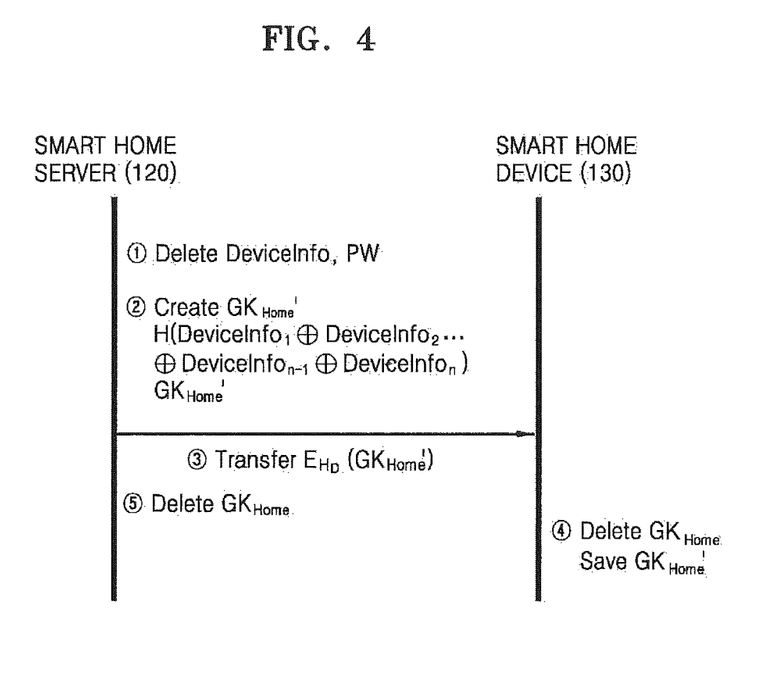
FIG. 4 is a view illustrating a procedure when a smart device withdraws from a smart-home environment, according to an embodiment of the inventive concept.

FIG. 4 is a view illustrating a procedure when an arbitrary smart device withdraws from a smart-home environment, according to an embodiment of the inventive concept.

① When the arbitrary smart device withdraws from the smart-home environment because the arbitrary smart device may not provide services due to deterioration and a breakdown, the server 120 deletes identification information DeviceInfo and a password PW of the withdrawing smart device from among pieces of identification information and passwords of the smart devices 130 forming smart-home.

② The server 120 operates the other pieces of identification information $DeviceInfo_1$, $DeviceInfo_2$, . . . , $DeviceInfo_n$ excluding the identification information DeviceInfo of the withdrawing smart device, and generates a new group key $GK_{HOME}'$. With reference to FIG. 2, when the new group key $GK_{HOME}'$ is already generated as the new smart device 140 is joined, the server 120 may regenerate a new group key as a smart device withdraws.

③ The server 120 encrypts the new group key $GK_{HOME}'$ with each of hash values corresponding to the pieces of identification information $DeviceInfo_1$, $DeviceInfo_2$, . . . , $DeviceInfo_n$ of the remaining smart devices 130 excluding the withdrawing smart device, and transmits the results to the remaining smart devices 130.

④ The remaining smart devices 130 deletes a previous group key $GK_{HOME}$ and stores the new group key $GK_{HOME}'$.

⑤ The server 120 deletes a previous group key $GK_{HOME}$.

Figure 5:
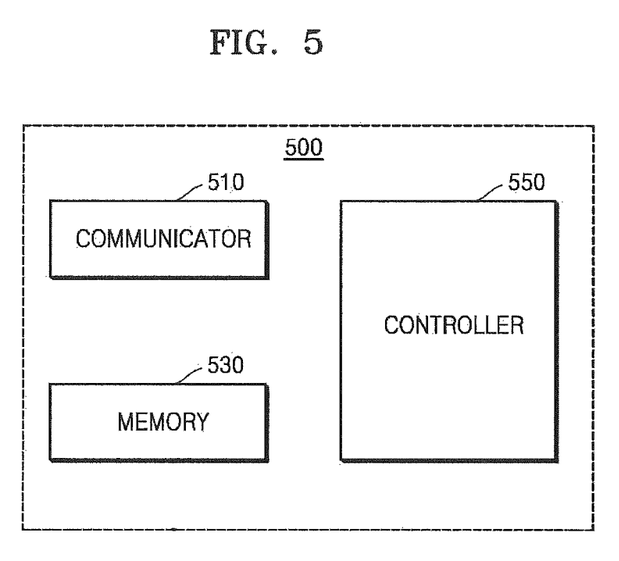
FIG. 5 is a block diagram of a configuration of a server, according to an embodiment of the inventive concept.

FIG. 5 is a block diagram of a configuration of a server 500, according to an embodiment of the inventive concept.

Referring to FIG. 5, the server 500 according to an embodiment of the inventive concept includes a communicator 510, a memory 530, and a controller 550. The communicator 510, the memory 530, and the controller 550 may be realized by at least one micro processor.

The communicator 510 communicates with the user terminal 110 and the smart devices 130. The communicator 510 may transmit and receive identification information, a password, a group key, a request message, or a random number to/from the user terminal 110 and the smart devices 130.

The memory 530 stores identification information and passwords of the smart devices 130 that are members of current smart-home, identification information and a password of the user terminal 110, and a group key being used in the current smart-home.

The controller 550 controls the communicator 510 and the memory 530, and may perform various operations such as group key generation, encryption, and decryption. For example, the controller 550 may authenticate the new smart device 140 and the user terminal 110, and may also generate a new group key according to procedures for joining of the new smart device 140 and withdrawing of a smart device.

Each of the smart devices 130 and the user terminal 110 may include, although not shown, a communicator, a memory, and a controller in the same manner as in the server 500 of FIG. 5.

The communicator of the smart devices 130 is provided to communicate with the server 500 and the user terminal 110, and the memory stores a group key, identification information and a password of the memory being used in current smart-home, and the controller performs various operations such as hash-value generation, encryption, and decryption while controlling the communicator and the memory.

The communicator of the user terminal 110 is provided to communicate with the server 500 and the smart devices 130, and the memory stores a group key, identification information and a password of the memory being used in current smart-home, and the controller performs various operations such as request message generation, random number generation, time information generation, encryption, and decryption while controlling the communicator and the memory.

Hereinabove, a procedure for joining a smart-home environment, a procedure for connecting a communication session, and a procedure for withdrawing are described. Safety and efficiency of smart-home according to the described procedures are as below.

(1) Safety

1) Confidentiality—The smart devices 130 needs to be guaranteed with confidentiality because the smart devices 130 include sensitive information such as personal information and control messages which may violate privacy. According to an example embodiment of the inventive concept, since a group key is distributed by a hash value of the smart devices 130, a device not registered at the server 120 may not decode the group key. Furthermore, a group key of smart-home may not be decoded because, even if one of the smart devices 130 is leaked, it is impossible to know information of the other devices. Furthermore, data confidentiality is provided by transmitting and receiving data by encrypting through a group key.

2) Access control—An attempt to access unauthorized device should be blocked in advance because a smart-home environment includes personal information and sensitive information. According to an example embodiment of the inventive concept, it is determined whether a device is a device capable of normally accessing smart-home by device identification information. Therefore, an unauthorized device may not access a smart-home environment.

3) Device integrity—An attacker may insert malicious software in the smart devices 130, or may change the use of the smart devices 130 through malware and infect a communication network. According to an example embodiment of the inventive concept, identification information of the smart devices 130 is hashed and thus a hash value is generated and stored. Accordingly, integrity is provided to information of a device added to smart-home or to be changed. In addition, any of the smart devices 130 not registered at smart-home may not access a smart-home environment. Furthermore, it is impossible to know a group key because hash values of all of the smart devices 130 are unknown even if information of the smart devices 130 is obtained.

4) Device authentication—Zombie smart devices inserting malware by accessing smart-home, sending a malicious e-mail, or generating Distributed Denial of Service (DDoS) attacks have increased. According to an example embodiment of the inventive concept, the smart devices 130 configuring smart-home may prevent access of an unauthorized smart device by sharing and storing a group key of smart-home.

(2) Efficiency

Figure 6A:
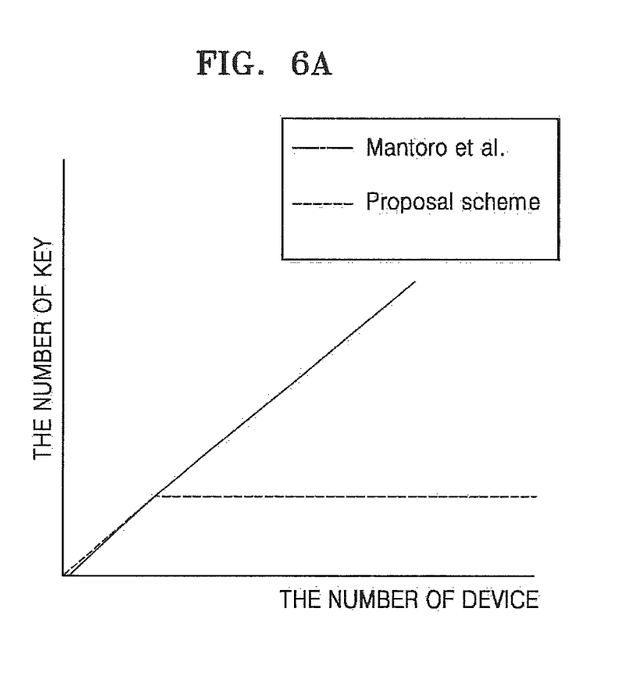
FIGS. 6A and 6B are graphs illustrating efficiency of a method according to an embodiment of the inventive concept compared with the conventional art.
Figure 6B:
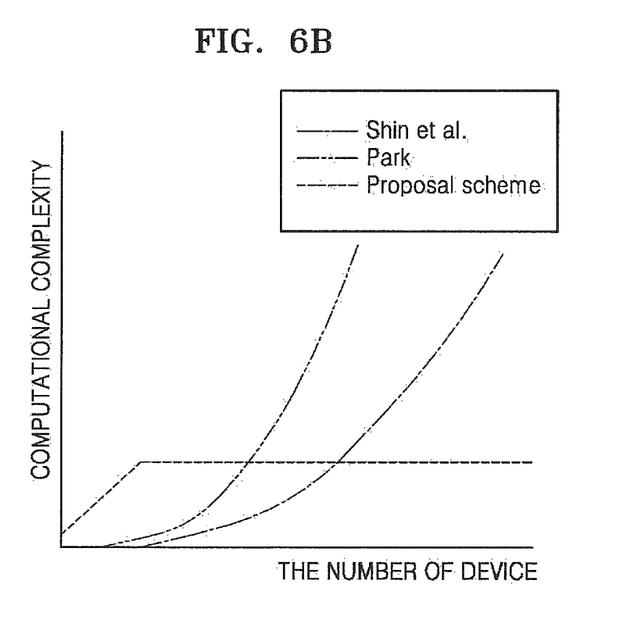

FIGS. 6A and 6B are graphs illustrating efficiency of a method according to an embodiment of the inventive concept compared with the conventional art. According to an example embodiment of the inventive concept, as illustrated in FIGS. 6A and 6B, it is efficient to authenticate a smart device based on a group key generated by the server 120, unlike the research of Mantoro, etc. wherein all devices store information and public keys of smart devices. Furthermore, the amount of computation increases when the number of tickets increases as the number of members of a group increases according to the research of Shin, etc., and the research of Park causes high overhead due to a large amount of computation by using a public key-based algorithm. However, according to an example embodiment of the inventive concept, it is efficient for the server 120 to generate a group key because the amount of computation does not change even if the number of devices increases.

Hereinabove, the inventive concept has been described with reference to the preferred embodiments of the inventive concept. However, it will be appreciated by those skilled in the art that various modifications and changes of the inventive concept can be made without departing from the spirit and the scope of the inventive concept which are defined in the appended claims and their equivalents.

What is claimed is:

1. A method of managing a smart-home environment by a server, the method comprising:
   receiving identification information and a password of an unauthenticated smart device from a user terminal;
   generating a new group key based on the received identification information of the unauthenticated smart device and identification information of authenticated smart devices;
   transmitting the new group key to the authenticated smart devices by encrypting the new group key with a previous group key without authentication for the authenticated smart devices;
   receiving identification information and a password from the unauthenticated smart device;
   comparing the identification information and the password received from the unauthenticated smart device with the identification information and the password received from the user terminal; and
   transmitting the new group key to the unauthenticated smart device according to a result of the comparison,
   wherein the previous group key is commonly used in the smart-home environment including the authenticated smart devices before the new group key is generated,
   receiving identification information, a password, a request message, and a random number of the user terminal from the user terminal;
   authenticating the user terminal by comparing pre-stored identification information and password of the user terminal with the identification information and the password of the user terminal received from the user terminal; and
   when the user terminal is authenticated, transmitting the request message and the random number to smart devices that are members of the smart-home in such a manner that the user terminal and a session between the smart devices that are members of the smart-home are connected to each other.

2. The method of claim 1, further comprising:
   generating a hash value of the identification information received from the user terminal, and
   the transmitting the new group key to the unauthenticated smart device comprises:
   transmitting the new group key to the unauthenticated smart device by encrypting with the generated hash value.

3. The method of claim 1, wherein the generating the new group key comprises:
   performing an Exclusive OR (XOR) operation of the identification information of the unauthenticated smart device received from the user terminal and the identification information of the authenticated smart devices.

4. The method of claim 1, wherein
   the identification information received from the unauthenticated smart device is encrypted with a hash value of the identification information of the unauthenticated smart device, and
   the method of managing the smart-home environment further comprises:
   decoding the encrypted identification information with a hash value of the identification information of the unauthenticated smart device received from the user terminal.

5. The method of claim 1, wherein
   the identification information, the request message, and the random number of the user terminal received from the user terminal are encrypted with a new group key when the new group key is already generated, or encrypted with an existing group key when the new group key is not generated yet.

6. The method of claim 1, wherein the receiving identification information, a password, a request message, and a random number of the user terminal from the user terminal comprises:
   further receiving time information from the user terminal; and
   authenticating the user terminal when a difference between the received time information and information about an actual time receiving the time information is a preset value or less.

7. The method of claim 1, further comprising:
   deleting identification information and a password of a withdrawing smart device from among pieces of identification information and passwords of smart devices configuring the smart-home environment;
   regenerating a new group key based on pieces of identification information of the other smart devices excluding the identification information of the withdrawing smart device; and
   transmitting the regenerated new group key to the other smart devices.

8. The method of claim 7, wherein the transmitting the regenerated new group key comprises:
   encrypting the regenerated new group key with each of hash values corresponding to the other smart devices and transmitting the results to the other smart devices, respectively.

9. The method of claim 1, wherein the transmitting the new group key to the unauthenticated smart device comprises transmitting the new group key to the unauthenticated smart device when the identification information and the password received from the unauthenticated smart device are respectively equal to the identification information and the password received from the user terminal.

* * * * *